United States Patent [19]

Chung et al.

[11] 4,405,239

[45] Sep. 20, 1983

[54] ENERGY EFFICIENT EXTRUDER SCREW

[76] Inventors: Chan I. Chung, 2483 Whitehall Ct., Schenectady, N.Y. 12309; Robert A. Barr, P.O. Box 4476, Virginia Beach, Va. 23454

[21] Appl. No.: 368,081

[22] Filed: Apr. 13, 1982

[51] Int. Cl.³ .............................................. B29B 1/06
[52] U.S. Cl. ..................................... 366/89; 366/323; 425/208; 198/661
[58] Field of Search .................. 366/88, 89, 79, 87, 366/80, 81, 322, 323; 425/207, 208, 209, 200; 100/117, 145–150; 198/661, 662

[56] References Cited

U.S. PATENT DOCUMENTS

| | | | |
|---|---|---|---|
| 3,487,503 | 1/1970 | Barr | 425/208 |
| 3,701,512 | 10/1972 | Schippers | 366/81 |
| 3,858,856 | 1/1975 | Hsu | 366/88 |
| 4,000,884 | 1/1977 | Chung | 366/88 |
| 4,173,417 | 11/1979 | Kruder | 366/89 |
| 4,310,484 | 1/1982 | Blakeslee | 425/208 |

Primary Examiner—Robert W. Jenkins
Attorney, Agent, or Firm—Mason, Fenwick & Lawrence

[57] ABSTRACT

Extruders are widely used to transform solid plastic materials into molten plastic materials. Because of the low thermal conductivity of plastic materials and the inefficient mixing of the plastic materials inside an extruder, the heat is not evenly distributed in the material being processed and some portion of the material emerges from the extruder with excessive heat. This invention discloses a new screw with a novel mixing section which promotes mixing of the hot, molten material with the cold, unmolten material inside the screw channel by its unique geometry, thereby improving the heat transfer from the hot, molten material to the cold, unmolten material and increasing the energy efficiency of the extruder.

6 Claims, 3 Drawing Figures

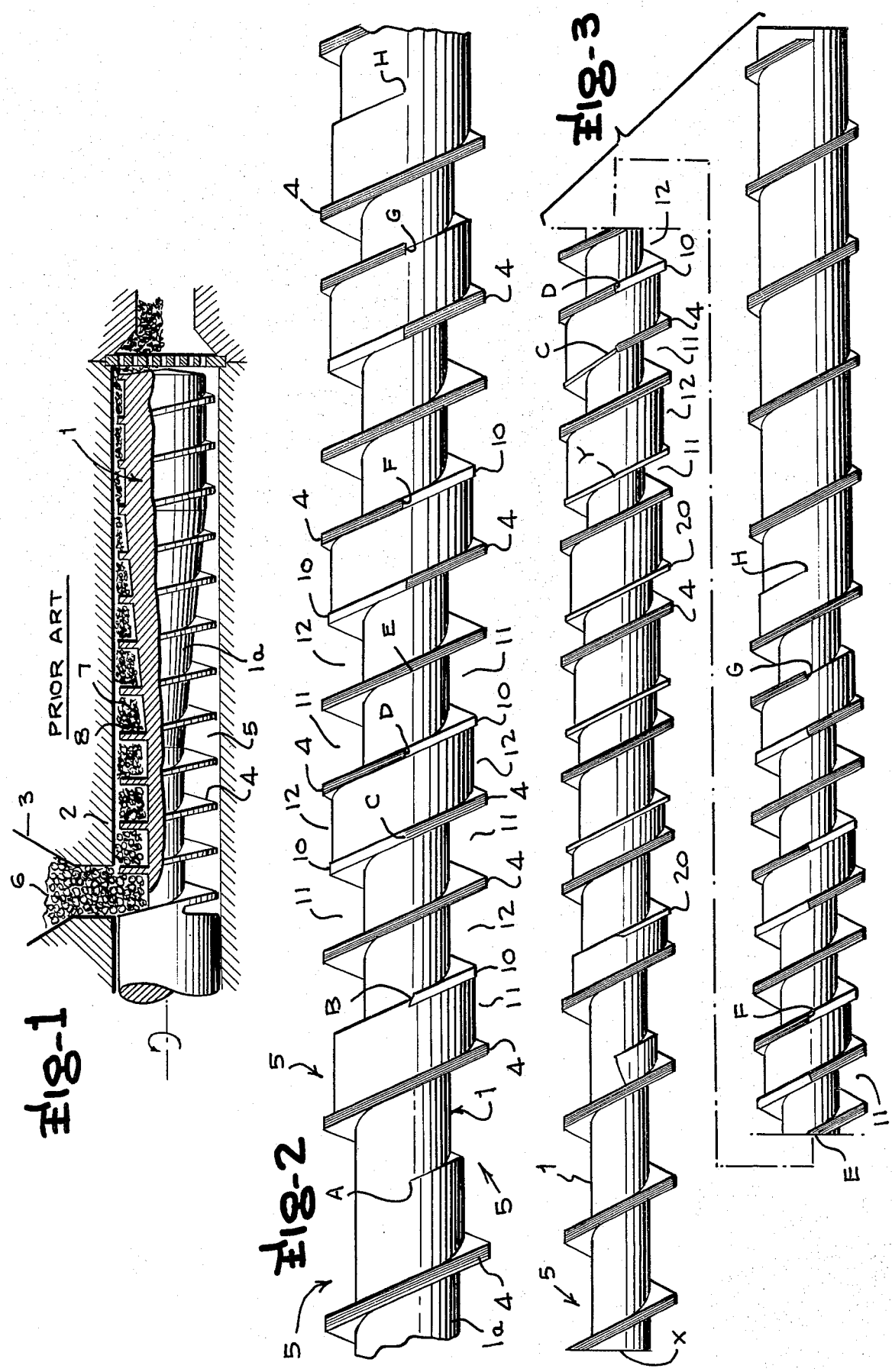

ENERGY EFFICIENT EXTRUDER SCREW

BACKGROUND OF THE INVENTION

This invention relates to an improved screw for use in an extruder for working a wide range of solid plastic materials into a substantially homogeneous, molten state suitable for formation into any desired shape by extrusion or injection into a die or mold. More particularly, the improved screw of the present invention is most readily used in what is known as a single screw extruder.

Extrusion, injection molding or blow molding with a single screw extruder, for example, having a screw of conventional design shown in FIG. 1, includes feeding the solid polymeric or plastic material in pellet, chip, powder, or flake form to the feed end of the extruder through a hopper mounted on an opening of the heated barrel in which a screw is rotatably mounted. The screw has at least one helical thread with a minimum clearance to the barrel, integrally mounted of formed on the core to create a helical channel, down which the plastic material is moved downstream from the feed end to the discharge end by forces exerted by the rotation of the screw. The solid plastic material fed into the screw channel is compacted into a solid plug or solid bed and the solid bed melts as it travels down the screw channel. The molten plastic material is collected by the wiping action of the thread into a melt pool. The melt pool gradually increases as the solid bed gradually melts, eventually occupying the entire screw channel.

Molten plastic materials have a very high viscosity and a large amount of heat is generated in the melt pool due to shearing of the melt pool by the rotation of the screw. Thus, the melt pool becomes hotter as it travels down the screw channel and often becomes undesirably hot by the time it reaches the discharge end. Heat transfer from the melt pool to the solid bed is inefficient because of the low thermal conductivity of plastic materials and the limited contact area between the melt pool and the solid bed. Increased heat transfer from the hot, molten plastic material in the melt pool to the cold, solid plastic material in the solid bed is highly desirable in order to reduce the temperature of the molten plastic material discharged from the extruder, increase melting capacity of the extruder and the increase energy efficiency of the extrustion process.

R. A. Barr and C. I. Chung, in U.S. Pat. No. 3,487,503, issued Jan. 6, 1970, use a plurality of pegs mounted crosswise in the screw channel suffiently near the discharge end whereon only a small fraction of the plastic material remains as solid in the screw channel. The pegs promote mixing of the solid plastic material with the molten plastic material bh breaking up the residual solid bed and thus increase the contact area between the solid plastic material and the molten plastic material, resulting in increased heat transfer from the molten plastic material to the solid plastic material.

H. Schippers et al, in U.S. Pat. No. 3,701,512 issued Oct. 31, 1972, divided the screw channel near the discharge end into a pair of side-by-side sub-channels of equal width by a second thread. The diameter of the second thread is sufficiently smaller than the diameter of the barrel such that its clearance to the barrel allows the plastic material to flow over the second thread. The depths of the two side-by-side sub-channels vary continuously and oppositely along the length of the passages so that the combined passage cross-sectional area of the two sub-channels is maintained constant. As one sub-channel becomes shallow in depth with diminishing cross-sectional area, the other sub-channel becomes depper correspondingly with enlarging cross-sectional area, so that the plastic material is forced to move from the diminishing sub-channel into the enlarging sub-channel flowing over the second thread. The second thread gives shearing to the plastic material while flowing over it. Such mechanism of moving the plastic material from one sub-channel into the other sub-channel is repeated a number of times. It is noted that, in the screw of H. Schippers et al, the first thread with a minimum clearance to the barrel continues to remain as the wiping thread throughout the entire length of the screw while the second thread with a large clearance to the barrel remains for its entire length as the shearing thread over which the plastic material can flow. Such structure of the screw forces the plastic material to move from one sub-channel located downstream of the second thread or toward the discharge end, to the other sub-channel upstream of the second thread or toward the feed end of the second thread in one instance and then forces the plastic material to move back from the sub-channel located upstream of the second thread to the sub-channel located downstream of the second thread in the following instance. The rotation of the screw aids the movement of the plastic material from the sub-channel located downstream of the second thread into the sub-channel located upstream of the second thread, but resists the movement of the plastic material from the sub-channel located upstream of the second thread into the sub-channel located downstream of the second thread. The rotation of the screw causes the plastic material to move, relative to the screw, in the direction opposite to the screw rotation, and thus any movement of the plastic material in the direction of the screw rotation such as the movement of the plastic material from the sub-channel upstream of the second thread into the sub-channel downstream of the second thread is undesirable and can undermine the performance of the screw.

G. A. Kruder, in U.S. Pat. No. 4,173,417 issued Nov. 6, 1979, discloses a screw similar to that of H. Schippers et al. Kruder also divides the screw channel into two sub-channels of equal width by a second thread. The depths of the sub-channel are cyclically varied with crests and valleys such that the melting of the solid plastic material is maximized over the crests and the clearance of the second thread to barrel is made such that only molten plastic material can flow through the clearance while restricting the flow of solid plastic material through the clearance. Kruder states that the provision of the sub-channels, whose combined passage cross-sectional area is not constant along the length of the passages, serves to maximize the complexity of the flow pattern of the plastic material. It is noted that Kruder also uses the first thread with a minimum clearance to the barrel as the wiping thread throughout the entire length of the screw and the second thread with a large clearance as the shearing thread for its entire length.

Therefore, the screw of Kruder also suffers from the same disadvantage of moving plastic material in the direction opposite to the natural flow caused by the rotation of the screw as discussed for the screw of Schippers et al.

It is an objective of this invention to obtain an efficient mixing of the solid plastic material with the molten plastic material inside a single screw extruder in order to increase heat transfer from the hot, molten plastic material to the cold, solid plastic material thereby achieving increased melting capacity of the extruder, a lower temperature of the molten plastic material discharged from the extruder and a higher energy efficiency of the extrusion process.

A further objective is to achieve an efficient mixing of the solid plastic material by making the plastic material, both solid and molten, to flow only in the direction of the natural flow caused by the rotation of the screw.

Objectives ancillary to the foregoing objectives are to teach and provide an extruder screw to accomplish said objectives.

SUMMARY OF THE INVENTION

The above objectives are accomplished by providing a novel screw structure for single screw extruders which, by the rotation of the screw, forces the solid bed inside the screw channel to break up into small pieces and mix with the molten plastic material in the melt pool thereby greatly increasing heat transfer from the molten plastic material to the solid plastic material. The novel screw structure consists of (a) division of the screw channel into two sub-channels of substantially equal width by a second thread substantially parallel to the first thread but with a large clearance to the barrel so as to allow easy movement of the plastic material, both solid and molten, through the clearance; (b) gradual reduction of the depth of the sub-channel located downstream of the second thread accompanied by gradual increase of the depth of the sub-channel located upstream of the second thread such that the solid plastic material as well as the molten plastic material in the sub-channel with decreasing cross-sectional area is forced to flow over the second thread into the sub-channel with increasing cross-sectional area by the forces exerted by the rotation of the screw; (c) at a point where the depth of the sub-channel with decreasing cross-sectional area is reduced to substantially the size of the feed components of the solid plastic material but not less than the clearance of the second thread, the first thread converting to become the shearing thread with a large clearance to the barrel and the second thread converting to become the wiping thread with a minimum clearance to the barrel and repeating the gradual and opposite change in the depths of the two sub-channels as described in step (b); (d) duplicating the steps of (b) and (c) once or more; (e) and finally merging the two sub-channels into one channel of equal depth by eliminating the shearing thread.

BRIEF DESCRIPTION OF THE FIGURES

FIG. 1 is a schematic, cross-sectional view of a single screw extruder having a screw of conventional design, depicting the workings of a screw.

FIG. 2 is a schematic view of the novel screw structure of the present invention.

FIG. 3 is a fragmented schematic view of a preferred screw embodying the novel screw structure of the present invention.

The structures and advantages of the novel screw structure of the present invention will be better understood and appreciated by reading the following detailed description in conjunction with the above drawings.

DETAILED DESCRIPTION OF THE INVENTION

Consideration of the components of a single screw extruder relevant to the present invention, the general structure of a typical screw and the function of a screw will be helpful in understanding and appreciating the novel screw structure of the present invention. Referring to FIG. 1, a single screw extruder includes a screw 1 rotatably mounted inside a cylindrical barrel 2 and a hopper 3 mounted in an opening of barrel 2 at the feed end of the extruder. Screw 1 has at least one helical thread 4 with a minimum clearance to barrel 2 integrally mounted or formed on its core 1a. Thread 4 creates a helical channel 5 radially extending around core 1a of screw 1. The number of turns of thread 4 around core 1a will be called, hereinafter, "turns" for brevity. The axial distance between one turn of thread 4 is called "pitch". The depth of channel 5, the turns of thread 4, the pitch and width of thread 4 along screw 1 are not critical features of this invention. Their actual values along screw 1, constant and varying, depend on the particular requirements and desires of the users of screw 1. They can be changed from those indicated in the drawings without affecting the critical features of this invention as disclosed and claimed.

A solid plastic material 6, or a mixture of materials, in pellets, chip, powder or flake form is fed into channel 5 through hopper 3. Solid plastic material 6 in channel 5 is compacted into a solid plug or solid bed 7 as it travels down channel 5 by forces exerted by the rotation of screw 1. Solid bed 7 melts, primarily in contact with heated barrel 2, as it travels down channel 5 and the molten plastic material is collected by the wiping action of advancing thread 4 into melt pool 8. Melt pool 8 gradually increases long channel 5 as solid bed 7 gradually melts, eventually occupying the entire channel 5 toward the discharge end.

The main objectives of this invention are accomplished by the structural features of screw 1 for breaking up solid bed 7 into small pieces and mixing the small pieces of solid bed 7 into melt pool 8 by the natural forces exerted by the rotation of screw 1.

Referring to FIG. 2, A represents a position along screw 1 located at about one third to two thirds of the length of screw 1 through hopper 3, where channel 5 contains about 5 to 50% solid plastic material with the rest being molten plastic material. At A, one half of channel 5 toward the feed end, to be called front half channel hereinafter, starts to gradually decrease its depth while the other half of channel 5 toward the discharge end, to be called back half channel hereinafter, starts to gradually increase its depth. At B which is located about one half to one turn toward the discharge end from A, the front half channel attains its minimum depth which is comparable to or greater than the size of the individual components of the solid plastic material but not less than about 0.030 inch while the back half channel attains its maximum depth which is comparable to or less than the depth of channel 5 under hopper 3. Such a structural feature between A and B causes substantially the entire amount of solid bed 7 present at A as well as a major portion of melt pool 8 to go into the back half channel at B and allows predominately molten plastic material to pass through the front half channel at B. A second thread 10, which is substantially parallel to thread 4 and has a large clearance to barrel 2 comparable to but not less than the dpeth of the front half channel at B, originates at B rising from the floor of channel 5 and divides channel 5 into two sub-channels, a front sub-channel 11 which corresponds to the front half channel and a back sub-channel 12 which corresponds to the back half channel. The width of the second thread 10 may be the same as or different from that of thread 4. It is also possible, although not preferable, to originate the second thread 10 at A. The depth of front sub-channel 11 gradually increases starting at B, reaching maximum at C which is located at about one half to one turn toward the discharge end from B while the depth of back sub-channel 12 decreases starting at B, reaching minimum at C. The depth of front sub-channel 11 at C is comparable to or less than the depth of channel 5 under hopper 3, and it may be the same as or different from the depth of the back half channel at B. The depth of back sub-channel 12 at C is comparable to or greater than the size of the individual components of the solid plastic material but not less than about 0.030 inch, and it may be the same as or different from the depth of the front half channel at B. The nature of the gradual increase and decrease on channel depth may be linear, cyclical or any other type as long as the change is gradual. The clearance of the second thread 10 may be kept constant or gradually varied between B and C. The combined cross-sectional area of front sub-channel 11 and back sub-channel 12 across second thread 10 may be kept constant or deliberately altered along the helical passage from B to C in order to cause random flow patterns of the plastic material for better mixing. Such structural feature between B and C causes by the forces exerted by the rotation of screw 1, a majority of the plastic material, both solid and molten, to move from back sub-channel 12 into front sub-channel 11 flowing over the second thread 10. Solid bed 7, while moving from back sub-channel 12 into front sub-channel 11 over second thread 10, will be broken up into small pieces and mixed with the molten plastic material thereby greatly increasing heat transfer from the molten plastic material to solid plastic material. The amount of shearing work exerted by second thread 10 to the plastic material depends on the width and especially clearance of second thread 10.

Second thread 10 converts to become thread 4 at C while thread 4 converts to become second thread 10 at D which is located on thread 4 substantially across C toward the discharge end. The maximum depth of front sub-channel 11 is maintained between C and E which is located at about one half to preferably one turn toward the discharge end from C. The unique conversions of the threads at C and D together with the structural features between C and E make the geometries of screw 1 at D substantially the same as those at B. The structural features between B and D are repeated between D and F in substantially the same way, causing a major portion of the plastic material, both solid and molten, collected in front sub-channel 11 to move back into back sub-channel 12 again by the forces exerted by the rotation of screw 1. The movement of the plastic material to the opposite direction of the natural movement requires a high pressure buildup in the delivery sub-channel, and the high pressure can cause undesirable heat buildup and reduction in the pumping capacity of screw 1. The structural features between B and D may be repeated in substantially the same was as many times as desired between F and G. The depths of front sub-channel 11 and back sub-channel 12 and the clearance of second thread 10 may be made different from those used between B and D in each repeat cycle in order to achieve the optimum mixing and melting functions of screw 1. Second thread 10 terminates at G, and front sub-channel 11 and back sub-channel 12 merge to become a single channel by gradually changing their depths to a common depth at H which is located about one half to one turn toward the discharge end from G. Second thread 10 may be present between G and H, terminating at H. The depth of channel 5 usually is kept constant from H to the end of screw 1.

FIG. 3 shows a screw with a preferred embodiment of the present invention. The portion of the screw between X and Y is described by C. I. Chung in U.S. Pat. No. 4,000,884 issued Jan. 4, 1977. The screw geometry between X and Y utilizing a barrier thread 20, which is substantially parallel to thread 4 and has a small clearance of about 0.010 inch to 0.050 inch to barrel 2 such that only the molten plastic material can flow through the clearance, is well known to give greater melting capacity and stability of extrusion. At Y, back sub-channel 12 has a depth greater than the size of the components of the solid plastic material and contains substantially all solid plastic material corresponding to about 5 to 50% of the entire feed rate. Front sub-channel 11 at Y has a depth comparable to the depth of channel 5 under hopper 2 and contains substantially all molten plastic material. The width of front sub-channel 11 is about half of that of back sub-channel 12. The width of front sub-channel 11 gradually increases while the width of back sub-channel 12 gradually decreases starting from Y until the widths of both sub-channels become equal at C which is located about one quarter to one turn toward the discharge end from Y. Barrier thread 20 may be present or eliminated between Y and C. C in FIG. 3 corresponds to C in FIG. 2, and the structural features at C, D, E, F, G, and H in FIG. 3 are identical to those corresponding to FIG. 2.

All variations or modifications apparent to those skilled in the art on reading this disclosure, which can be made without sacrificing the main advantage of this invention, are within the full and intended scope of this invention as defined by the attached claims. For an example, second thread 10 may be made to have a clearance close to the depth of the shallower sub-channel or completely eliminated for the maximum easiness of material movement. For another example, front sub-channel 11 and back sub-channel 12 may be helically offset to some extent from the optimum material movement. Still for another example, the clearance of second thread 10 to barrel 2 may be made somewhat smaller than the size of the components of the solid plastic material to impart some difficulty for the movement of the solid plastic material. Yet in another example, the structural features of this invention disclosed above may be initiated by gradually increasing the depth of the front half channel accompanied by a gradual decrease of the depth of the back half channel.

We claim:
1. A screw used for a single screw extruder which houses said screw rotatably in a cylindrical barrel for plasticating or melting solid plastic material, said screw having a feed end and a discharge end:
   said screw embodying a novel mixing section between the feed end and discharge end of said screw comprising: at least one pair of substantially parallel, helical, first and second threads integral with the core of said screw;

said first thread of the pair originating at the feed end of said screw creating a helical channel and having a minimum clearance to said barrel;

said second thread of the pair originating at a location about one third to two thirds of the length of said screw from the feed end of said screw by rising from the core of said screw and having a large clearance to said barrel comparable to or greater than the size of the components of said solid plastic material;

said second thread of the pair dividing said helical channel created by said first thread into two sub-channels of substantially equal width, one located toward the feed end of said screw from said second thread hereinafter called a front sub-channel and the other located toward the discharge end of said screw from said second thread hereinafter called a back sub-channel;

the depth of said front sub-channel gradually increasing to a maximum comparable to the depth of said helical channel at the feed end of said screw accompanied by gradual decrease of the depth of said back sub-channel to a minimum comparable to or greater than the size of the components of said solid plastic material over about one half to one turn of said second thread around the core of said screw, the gradual change being linear, cyclical or any other type as long as the change is gradual;

at the end of the depth reversal of said front sub-channel and said back sub-channel, said second thread converting to become said first thread with a minimum clearance to said barrel and said first thread converting to become said second thread with a large clearance to said barrel, and the maximum depth of said front sub-channel being maintained over about one half to one turn of said first thread around the core of said screw such that at this point the structural features of said screw become substantially similar to those at the beginning of the depth reversal;

then, duplicating the depth reversal between said front sub-channel and said back sub-channel;

the conversions of said first thread to said second thread and said second thread to said first thread followed by the depth reversal, being repeated as many times as desired but at least once;

and finally, said front sub-channel and said back sub-channel being merged to a single channel with a common depth by gradually changing their depths and eliminating said second thread.

2. The screw of claim 1 wherein the combined cross-sectional area of said front sub-channel and said back channel is kept substantially constant during the depth reversal.

3. The screw of claim 1 wherein the combined cross-sectional area of said front sub-channel and said back channel is varied during the depth reversal.

4. The screw of claim 1 wherein the clearance of said second thread to said barrel is varied along said second thread.

5. The screw of claim 1 wherein said second thread is made to disappear by making the clearance of said second thread to said barrel to be substantially the same as the depth of the shallower sub-channel.

6. The screw of claim 1 wherein said novel mixing section is embodied more than once.

* * * * *